United States Patent [19]

Rilly et al.

[11] Patent Number: 5,673,184
[45] Date of Patent: Sep. 30, 1997

[54] SWITCH MODE POWER SUPPLY CIRCUIT WITH INCREASED POWER FACTOR FOR MAINS

[75] Inventors: Gerard Rilly, Unterkirnach; José I. Rodriguez Duran, Villingen-Schwenningen; Harald Roth, Mönchweiler; Gerard Morizot, Villingen-Schwenningen; Thomas Schulz, St. Georgen, all of Germany

[73] Assignee: Deutsche Thomson-Brandt GmbH, Villingen-Schwennigen, Germany

[21] Appl. No.: 454,931

[22] Filed: May 31, 1995

[30] Foreign Application Priority Data

Sep. 1, 1994 [DE] Germany ............... 44 31 120.6
Jan. 28, 1995 [DE] Germany ............... 195 02 647.0

[51] Int. Cl.⁶ .................................................. H02M 3/335
[52] U.S. Cl. ........................... 363/21; 363/40; 363/97
[58] Field of Search .............................. 363/17, 20, 21, 363/39, 40, 41, 97, 98, 131, 132

[56] References Cited

U.S. PATENT DOCUMENTS 5,301,095 4/1994 Teramoto et al. ............... 363/21
5,331,534 7/1994 Suzuki et al. ................... 363/20
5,508,904 4/1996 Hara .................................. 363/21
5,515,257 5/1996 Ishii ................................... 363/21

*Primary Examiner*—Robert Nappi
*Assistant Examiner*—Adolf Berhane
*Attorney, Agent, or Firm*—Joseph S. Tripoli; Frederick A. Wein

[57] ABSTRACT

Switch mode power supplies produce a brief pulse-like load on the mains and have a high harmonic content. Such a high harmonic load on the mains is undesirable. There are increasingly strict regulations for the level of harmonic loads connected to the mains. The present switch mode power supply includes a series circuit formed by an inductor and a diode connected between a charge capacitor, which is dimensioned to be relatively small, and a pickoff of a primary winding of a transformer of the switch mode power supply. A relatively large energy storage capacitor connected to the primary winding is decoupled from the charge capacitor by a second diode. The series circuit produces an additional charging current, which extends the current which is drawn from the mains during one half cycle of the mains voltage, and reduces the amplitude of the current.

14 Claims, 4 Drawing Sheets

SWITCH MODE POWER SUPPLY CIRCUIT WITH INCREASED POWER FACTOR FOR MAINS

The invention is based on a switch mode power supply. Switch mode power supplies produce a severely pulsed load, that is to say a load which includes harmonics, on the mains. Such a load on the mains is undesirable because the existing line networks are utilized less well as a result of the skin effect, significant reactive currents are produced and information which is additionally transmitted via the networks can be interfered with. Internationally, there are thus increasingly strict regulations on the maximum harmonic load on the mains. The harmonic load is also called the power factor [sic].

The harmonic load on the mains can be reduced by inserting a relatively large inductor between the mains terminals and the mains rectifier. Such an inductor is, however, a relatively large and expensive component.

The invention is based on the object of developing a switch mode power supply using simple circuitry means such that the harmonic load on the mains is reduced and existing or future regulations on the harmonic load can be complied with. Advantageous developments of the invention are specified in the subclaims.

In the case of the invention, first of all the charge capacitor at the output of the mains rectifier is dimensioned to be so small that its voltage is an unfiltered half-wave sinusoidal voltage of constant polarity. The actual energy storage capacitor, which has a capacitance which is so large that its voltage is a filtered DC voltage without any significant AC voltage component, is connected in parallel with the series circuit formed by the primary winding of the transformer and the switching transistor. The charge capacitor, which has a small capacitance, and the energy storage capacitor, which has a large capacitance, are decoupled from one another, either being completely isolated from one another or being connected to one another via a decoupling diode. In addition, the charge capacitor is connected to a pickoff of the primary winding via the series circuit formed by an inductor and a diode.

The series circuit formed by the inductor and the diode forms an additional charging path for the energy storage capacitor. The current which flows in this charging path has, as desired, a significantly longer duration than the pulsed charging current which normally flows. As a consequence, the harmonic load on the mains is greatly reduced by the current which is drawn from the mains being approximated to the ideal current corresponding to the mains voltage. The width, that is to say the duration of this current during one half cycle of the mains, can be adjusted by the selection of the pickoff on the primary winding, that is to say by the turns ratio of the two winding parts of the primary winding, while the amplitude of the current can be adjusted by the value of the said inductor. The charge capacitor thus forms a dynamic voltage source for the additional charging current for the large energy storage capacitor in order to reduce the harmonics.

The circuit according to the invention is relatively simple since essentially only one inductor and two diodes are required. Said circuit makes it possible to dimension the harmonic load optimally, in particular as a result of the dimensioning of the inductance and as a result of the selection of the pickoff on the primary winding of the transformer. This inductance can be dimensioned to be relatively small since its transmits only part of the energy for the energy storage capacitor. A further advantage is that virtually no changes are required in terms of regulation and control when the invention is applied to existing switch mode power supplies. It is furthermore advantageous that a high level of security against pulse spikes is achieved as a result of a large energy storage capacitor being retained.

The charge capacitor and the energy storage capacitor are preferably isolated from one another by means of a decoupling diode. In this case, this diode has a double function. It is used on the one hand as a charging path for the energy storage capacitor and on the other hand to suppress pulse-like interference voltages on the charge capacitor. This diode can also possibly be omitted. The charge capacitor would then be connected only to the output of the mains rectifier and the energy storage capacitor to the primary winding, with no connection between these two capacitors apart from the series circuit formed by the inductor and the diode.

The turns ratio between the winding part of the primary winding between the pickoff and the switching transistor and the winding part between the pickoff and that end of the primary winding which is connected to the energy storage capacitor, which ratio determines the duration of the additional charging current during one power supply cycle is, for example, 2:1.

The pickoff of the primary winding can also be formed by one end of an additional winding of the transformer, whose other end is connected to one end of the primary winding. In this case, a plurality of parallel-connected additional windings are preferably provided. The primary winding itself is in this case preferably split into a number of winding parts which are located in separate chambers in a chamber coil former, an additional winding being located in each chamber. Such a chamber coil former produces close coupling between the windings. In the case of this solution, only one additional pin is moreover required on the transformer.

The small charge capacitor preferably has a capacitance in the order of magnitude of 0.5 µF, while the large energy storage capacitor has a capacitance in the order of magnitude of 100 µF. The charge capacitor is in this case dimensioned such that its voltage does not fall to zero in the region of the zero crossover of the mains voltage and, instead of this, has a constant value there.

BRIEF DESCRIPTION OF THE DRAWINGS

The invention is explained in the following text with reference to the drawing, in which.

DETAILED DESCRIPTION OF THE PREFERRED EMBODIMENTS

Figure 1:
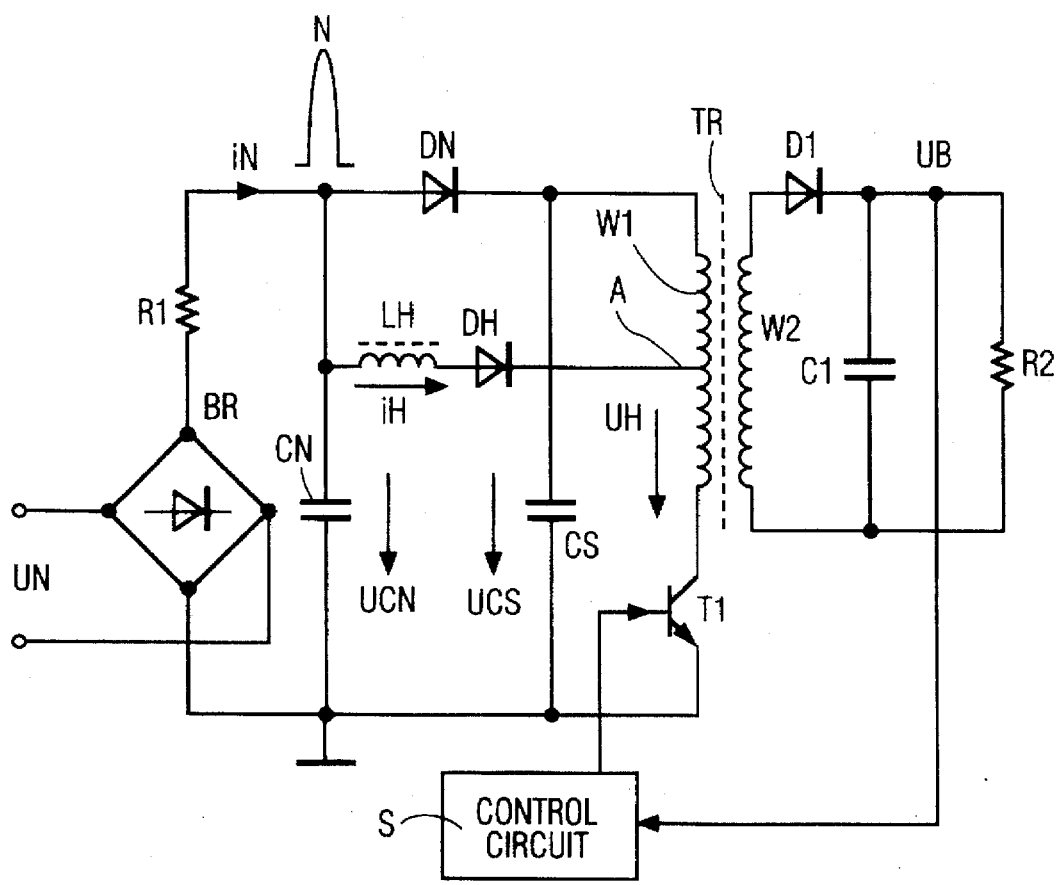
FIG. 1 shows an exemplary embodiment of the invention.

FIG. 1 shows the construction of a switch mode power supply. The illustration shows the mains voltage UN, the mains rectifier BR, the current limiting resistor R1, the charge capacitor CN, the transformer Tr having the primary winding W1 and the secondary winding W2, the switching transistor T1, the diode D1 for producing the operating voltage UB on the filter capacitor C1 for the load R2 and the control circuit S, which is supplied by the secondary and controls the switch in the sense of stabilizing the operating voltage UB. The charge capacitor CN and the energy storage capacitor CS are decoupled from one another by means of the decoupling diode DN. In addition, the series circuit formed by the inductor LH and the diode DH is inserted between the charge capacitor CN and the pickoff A of the primary winding W1.

The method of operation of this circuit will be explained with reference to FIG. 2. FIG. 2a shows one half cycle of the mains voltage UN. A switch mode power supply without any special measures would draw from the mains a current iN1 which occurs in pulsed form in the region of the maximum of UN. This current would contravene existing or future regulations on the harmonic load on the mains. The current iN2 is now drawn from the mains in a desirable manner as a result of the additional circuit measures in FIG. 1, which current iN2 has a greater duration and a smaller amplitude during the mains half cycle and is thus a far better approximation to the ideal wave form which is proportional to UN.

The voltage UCN on the charge capacitor CN according to FIG. 2b is a pulsating sinusoidal voltage as a result of on [sic] a correspondingly small charge capacitor CN, which sinusoidal voltage, however, does not fall to zero in the region of the zero crossovers of UN but has a constant value there. The voltage UCS on the large energy storage capacitor CS is a filtered DC voltage which virtually does not drop during one half cycle. The diode DN forms a first charging path for CS which, however, on its own would produce a current iN1 containing undesirable harmonics. The series circuit formed by LH and DH now forms a second charging path for CS. As a result of particular selection of the value of LH and of the pickoff A, an additional charging current flows in CS in the region of the maximum of UN. This charging current has a longer duration and a smaller amplitude than iN1, so that the current which is drawn from the mains is converted, for example, from the form iN1 into the form iN2 in accordance with FIG. 2a.

Figure 2:
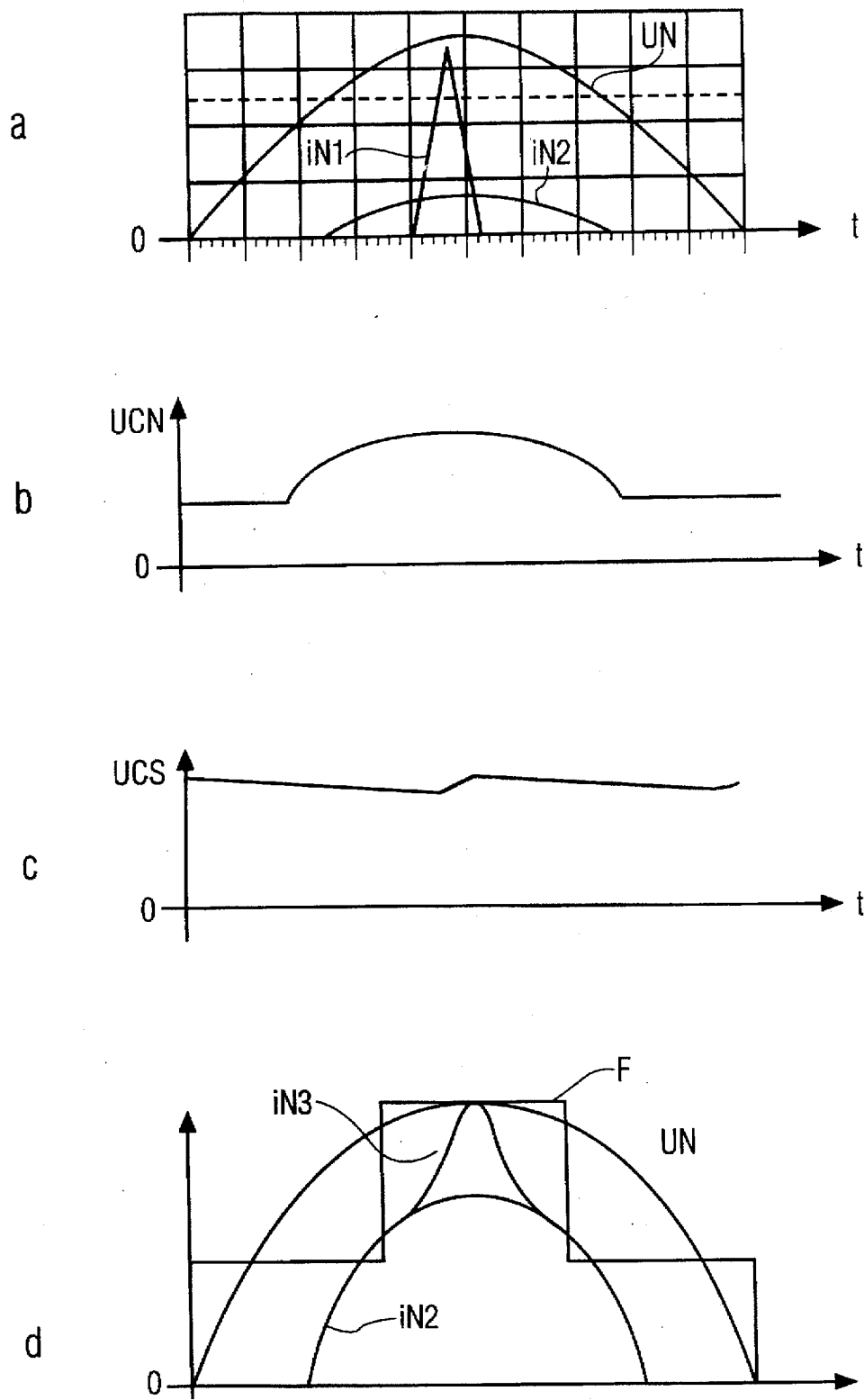
FIG. 2 shows an example of a development of the invention.

FIG. 2d shows a window F which represents a regulation for the current which is drawn from the mains. Because of its short duration, the current iN1 according to FIG. 2a would lie within this window and would not assume the form of iN2 as desired. However, the current iN2 according to FIG. 2d has the required form since it exceeds the edges formed by the window F and has a sufficiently long duration. iN2 according to FIG. 2 would flow if the diode DN remains reverse-biased or is not present. If DN is additionally forward-biased, the current iN3 also flows in addition.

In addition to its function as a charging path for CS, the diode DN also has the following advantageous effect: as a result of the effect of DN, the voltage VCN cannot in practice become more positive than the voltage UCS on CS. The voltage UCS meanwhile cannot change like a pulse, in practice, because of the large energy storage capacitor CS. In consequence, interference pulses N at the output of the mains rectifier BR or on the charge capacitor CN are thus suppressed in a desirable manner.

Figure 3:
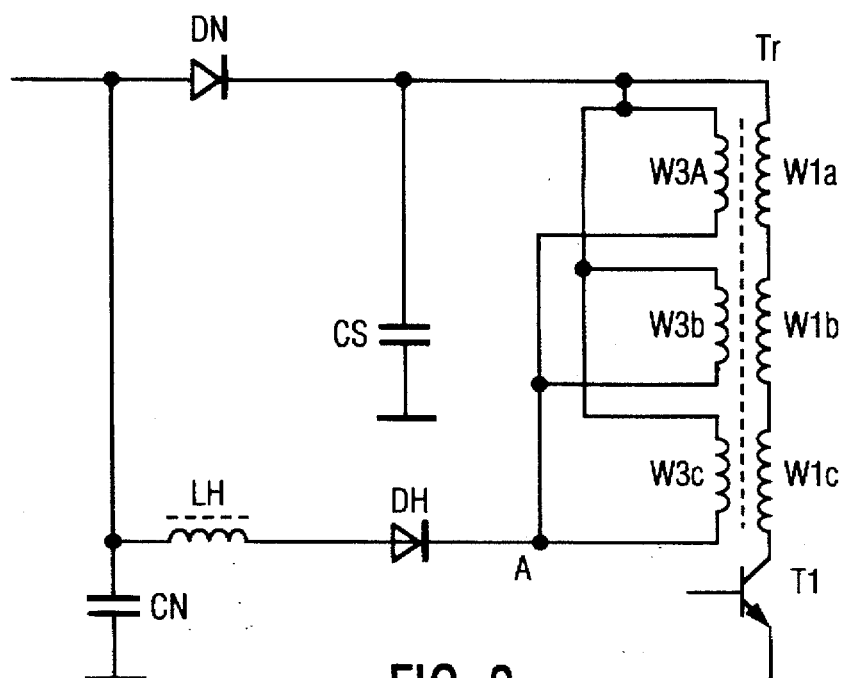
FIG. 3 shows curves in order to explain the method of operation of the circuit according to FIG. 1, FIGS. 4–6 show further examples of developments of the invention.

FIG. 3 shows a modification of the circuit according to FIG. 1 in terms of the implementation of the pickoff A. The pickoff A is formed by an additional winding W3 on the transformer Tr, which additional winding W3 comprises three parallel-connected winding parts W3a, W3b and W3c. The primary winding W1 is likewise divided into three winding parts W1a W1b and W1c. Two associated winding parts, that is to say W1a and W3a, W1b and W3b and W1c and W3c are in each case located together in a chamber in a chamber coil former. A chamber coil former has particularly close coupling between the windings and can be produced economically in production engineering terms. The solution according to FIG. 3 has the advantage that only one additional connecting pin or pin, specifically for the pickoff A, is required on the transformer Tr. Otherwise, the circuit according to FIG. 3 operates in a corresponding manner to the circuit according to FIG. 1.

Figure 4:
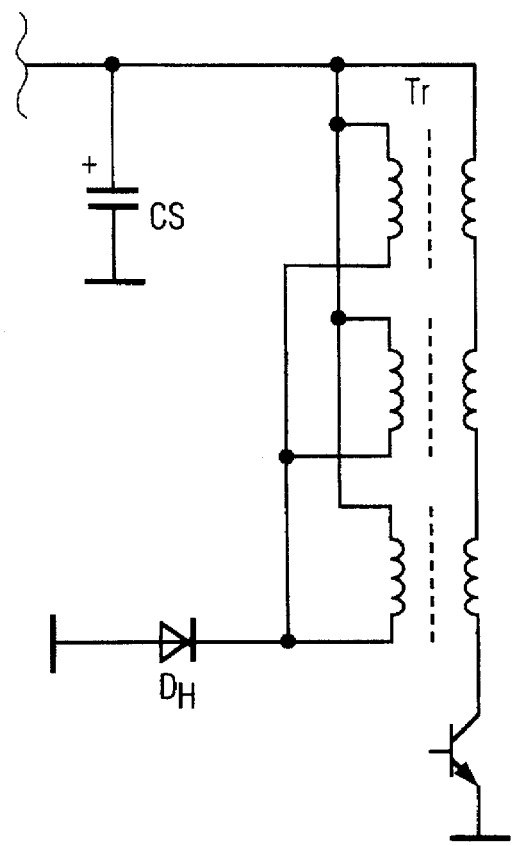

FIG. 4 shows one version of the transformer Tr. The chamber transformer is placed parallel to the primary windings, which are distributed over various chambers, each in the ratio of a tapping winding. These tapping windings are connected in parallel.

Figure 5:
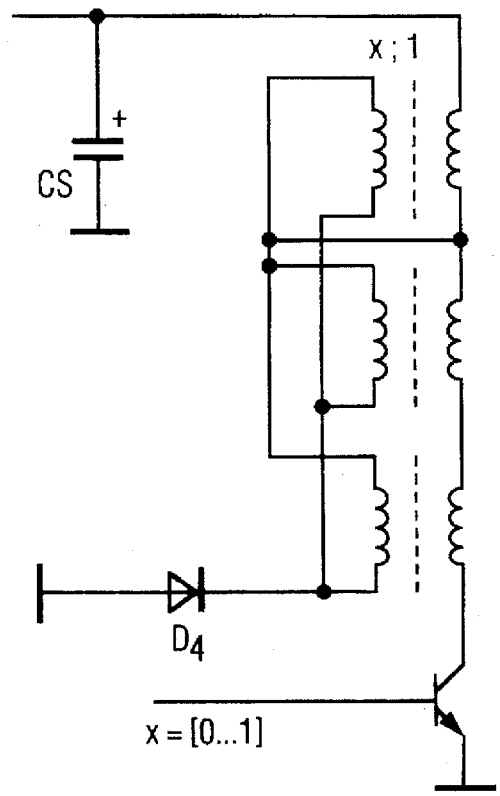

FIG. 5 shows a further version of the tapping of the transformer Tr. The tapping windings are connected in parallel and are additionally connected to a tapping on the primary winding.

Figure 6:
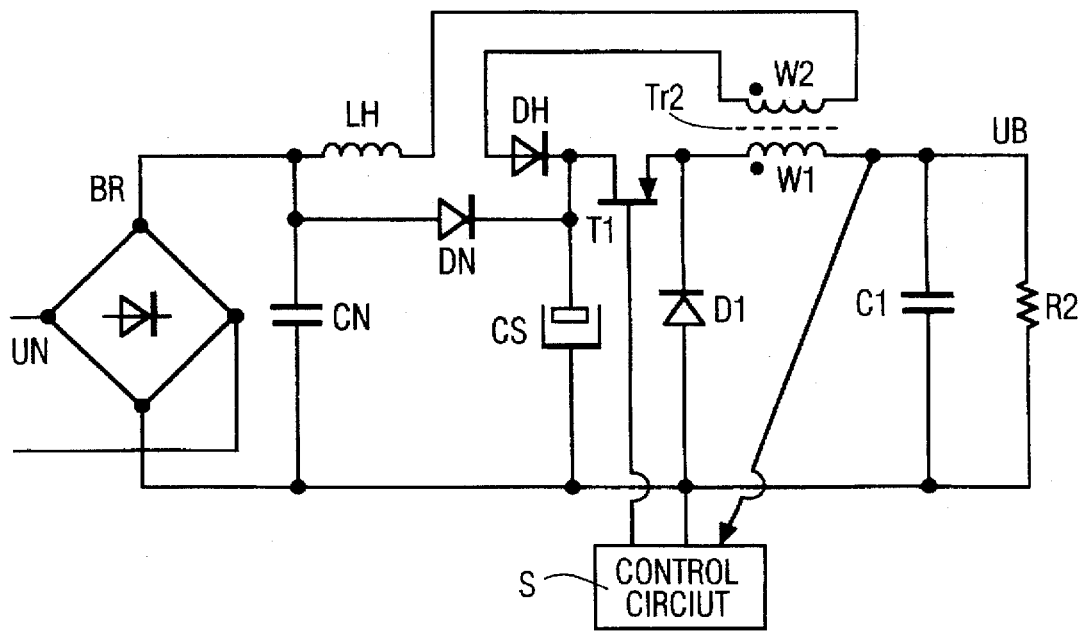

FIG. 6 shows a development of the invention. The circuit is constructed in a similar manner to the circuit according to FIG. 1. However, it does not contain an isolated transformer but is constructed as a so-called step-down circuit. The same parts as those in FIG. 1 are in this case provided with the same reference symbols. The left-hand part of the circuit as far as the switching transistor T1 is used to reduce the harmonic load on the mains. The right-hand part of the circuit, starting from the switching transistor T1, is a so-called step-down circuit which once again produces the operating voltage UB on the load R2. The secondary winding W2 of the transformer Tr2 is connected in series with the inductance LH, the primary winding W1 of said transformer Tr2 forming the inductance of the step-down circuit. The current flow duration from the mains rectifier BR during one cycle is once again extended, as a result of the feedback from the step-down circuit into the circuit for reducing the harmonic load, such that the harmonic load on the mains is reduced. The circuit according to FIG. 6 has a plurality of advantages:

A plurality of previously required components are dispensed with as a result of the combination of the circuit for reducing the harmonic load and the step-down circuit according to FIG. 6. In particular, only one switching transistor T1 is required for both circuits, in comparison with known circuits. The inductance LH is considerably reduced in comparison with known circuits, to be precise, for example, from 500 µH to 75 µH. As a result of the fact that only one switching transistor T1 is used for both circuits, only one control circuit is also required overall. The circuit according to FIG. 6 is suitable, in particular, for controlling a metal-halide lamp, which then represents the illustrated load R2. The turns ratio of the transformer Tr2 is approximately W1:S2=2:1.

Figure 7:
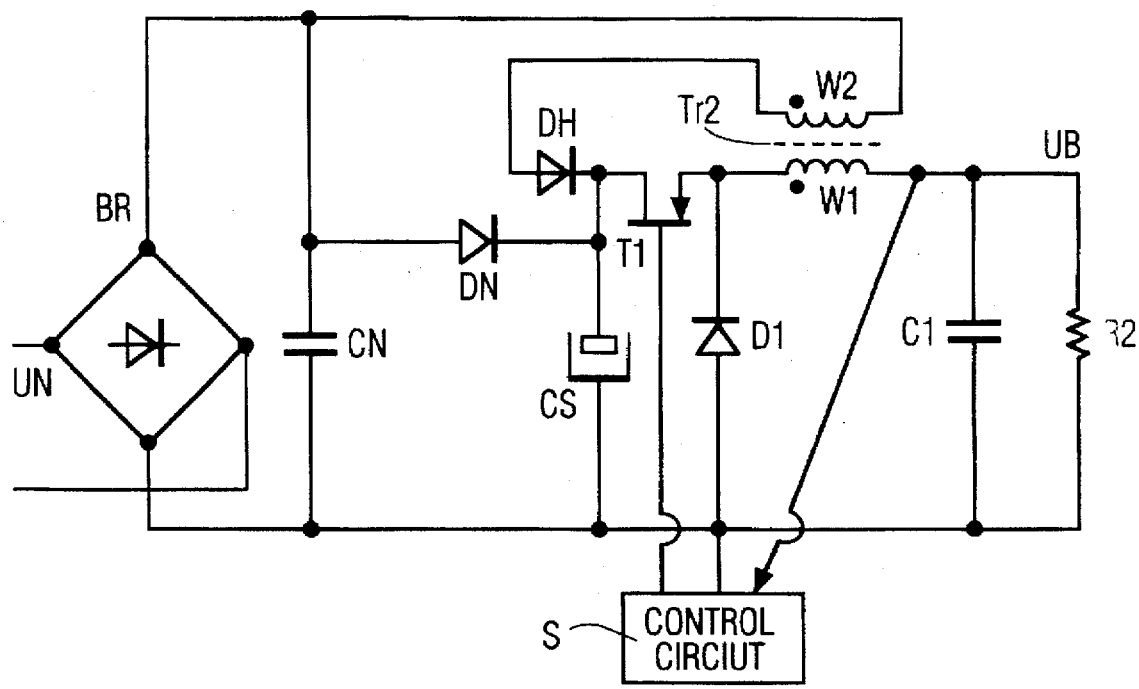
FIG. 7 shows a simplified modification of the circuit according to FIG. 6.

FIG. 7 shows a simplified version of the circuit according to FIG. 6. The inductance LH which is illustrated in FIG. 6 is no longer present in FIG. 7, but formed by the stray inductance of the secondary winding W2 of the transformer Tr2. The inductance LH is in consequence no longer required as a separate component in the form of an inductor.

Figure 8:
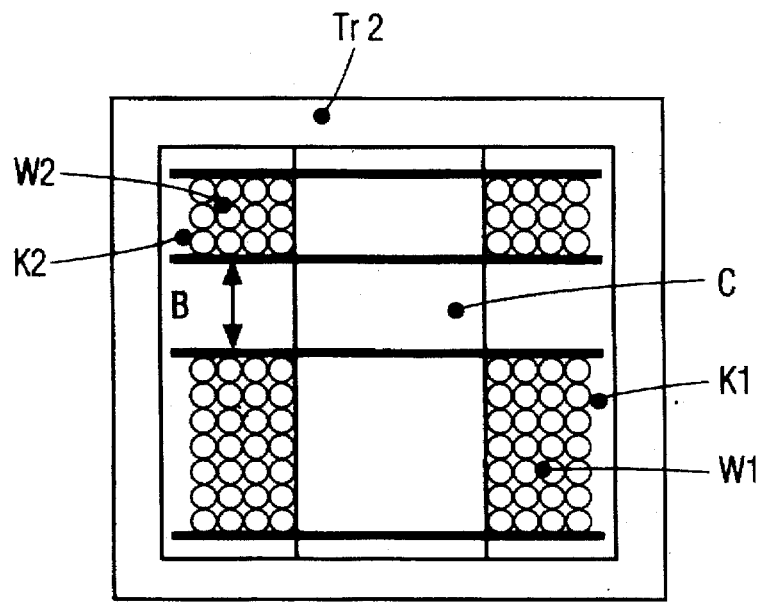
FIG. 8 shows the physical design of the transformer which is used in the circuits according to FIGS. 6 and 7.

FIG. 8 shows a practical version of the transformer Tr2. The primary winding W1 and the secondary winding W2 are located in two chambers K1 and K2 in a chamber coil former C. The chambers K1, K2 are spaced apart from one another in the axial direction of the coil former C by means of an intermediate space B which is not wound. The desired stray inductance for the secondary winding W2 in order to implement the inductance LH can be adjusted by selection of this separation B.

In the case of a circuit which was tested in practice, the components had the following values:

CN: 0.7 μF

CS: 100 μF

LH: 300 μH, only 75 μH in FIG. 6

We claim:

1. A switch mode power supply with a reduced harmonic load on mains, comprising:

a mains rectifier, an output of the mains rectifier being coupled to a charge capacitor and to a series circuit, the series circuit comprising:
  a diode,
  a primary winding of a transformer,
  a switching transistor, and
  an energy storage capacitor coupled in parallel with said primary winding and said switching transistor, with the voltage thereacross being a smoothed DC voltage, the charge capacitor being further coupled to a tap of said primary winding via a second series circuit comprising an inductor and a diode.

2. The power supply as claimed in claim 1, wherein said tap is a middle tap of said primary winding.

3. The power supply as claimed in claim 2, wherein a winding ratio between a winding part between said tap and the switching transistor, and a winding part between said tap and an end of the primary winding which is connected to the energy storage capacitor, is about 2:1.

4. The power supply as claimed in claim 1, wherein said tap of the primary winding is formed by one end of an additional winding of said transformer, the other end of the additional winding being coupled to one end of the primary winding.

5. The power supply as claimed in claim 4, wherein said additional winding comprises a plurality of parallel-connected additional windings.

6. The power supply as claimed in claim 5, wherein said main winding is split into a plurality of winding parts which are located in separate chambers of a coil former and are coupled together with an additional winding.

7. A switch mode power supply with a reduced harmonic load on mains, comprising:

a mains rectifier, an output of the mains rectifier being coupled to a charge capacitor and to a switching transistor via a series circuit, the series circuit comprising a first inductance and a diode, the switching transistor being coupled via a second inductance to a filter capacitor which provides an operating voltage, the first inductance being coupled in series with the second inductance and being magnetically coupled to the second inductance.

8. The power supply as claimed in claim 7, wherein the second inductance is formed by a secondary winding of a transformer whose primary winding forms the first inductance.

9. The power supply as claimed in claim 7, wherein said output of the mains rectifier is coupled via a second series circuit formed by a third inductance, to the first inductance, the diode, a collector/emitter path of said transistor, and the second inductance to the filter capacitor, which supplies an operating voltage.

10. The power supply as claimed in claim 9, wherein the load supplied by the power supply is a fluorescent tube.

11. The power supply as claimed in claim 8, wherein a winding ratio of the primary winding with respect to the secondary winding of the transformer is approximately 2:1.

12. The power supply as claimed in claim 9, wherein the third inductance is formed by stray inductance of the secondary winding.

13. The power supply as claimed in claim 11, wherein the primary winding and the secondary winding are located in two chambers of a coil former.

14. The power supply as claimed in claim 13, wherein the two chambers are spaced apart from one another in the axial direction by means of an intermediate space which is without windings.

* * * * *